United States Patent [19]
Lee

[11] Patent Number: 5,966,191
[45] Date of Patent: Oct. 12, 1999

[54] LIQUID CRYSTAL DISPLAY DEVICE WITH RETAINED LIGHT GUIDE PLATE

[75] Inventor: Sang-hee Lee, Kyonggi-do, Rep. of Korea

[73] Assignee: Samsung Electronics Co., Ltd., Rep. of Korea

[21] Appl. No.: 09/060,049

[22] Filed: Apr. 14, 1998

[30] Foreign Application Priority Data

Jun. 30, 1997 [KR] Rep. of Korea ...................... 97-29363

[51] Int. Cl.⁶ ............................................... G02F 1/1333
[52] U.S. Cl. ............................................................ 349/58
[58] Field of Search .................................. 349/58, 64, 65; 348/838; 361/32

[56] References Cited

U.S. PATENT DOCUMENTS

| | | | |
|---|---|---|---|
| 5,666,172 | 9/1997 | Ida et al. ..................................... | 349/58 |
| 5,729,310 | 3/1998 | Horiuchi et al. ........................... | 349/58 |
| 5,815,224 | 9/1998 | Hasegawa et al. ........................ | 349/58 |
| 5,838,400 | 11/1998 | Ueda et al. ................................. | 349/58 |

*Primary Examiner*—James Dudek
*Attorney, Agent, or Firm*—Myers Bigel Sibley & Sajovec

[57] ABSTRACT

A liquid crystal display (LCD) of the type having a mold frame, a back cover and a reflecting sheet and defining, for design margin reasons, a gap between the mold frame and the back cover, wherein means are provided to prevent the reflective sheet from moving through the gap when the LCD is subjected to impact and vibration.

12 Claims, 5 Drawing Sheets

LIQUID CRYSTAL DISPLAY DEVICE WITH RETAINED LIGHT GUIDE PLATE

FIELD OF THE INVENTION

The present invention relates generally to liquid crystal display units (LCDs), and more particularly to LCD units with a light reflecting sheet that prevents degradation of display performance which may otherwise occur when the unit is subjected to impact and vibration.

BACKGROUND OF THE INVENTION

LCD units are often employed as the display devices in numerous products. A typical LCD unit comprises an LCD panel that includes a plurality of polarized crystals which, upon the application of a predetermined electric field from an external source, form a desired image that displays specific information. As such, information can be quickly displayed and modified with little energy and no moving parts.

LCD panels are merely light receiving devices, and as such do not themselves emit light. As a result, in many applications an LCD unit may also employ a backlight unit to provide the LCD panel with sufficient light that the information displayed can be seen easily. The backlight unit includes a lamp assembly and a series of overlying sheets that receive and modify the character of the light. Generally, the lamp assembly is formed as an integrated unit that can be easily replaced when its performance deteriorates. The overlying sheets typically include, in order, a protecting sheet, a prism sheet, a diffusing sheet, a light guide plate and a reflecting sheet. Both the lamp assembly and the overlying sheets are mounted within a mold frame, wherein the lamp assembly is inserted into one or both ends of the light guide plate. In order to prevent the light guide plate and the sheets from moving toward the lamp assembly, guide members are formed on the mold frame. Right-angled guide grooves are formed on the corners of the light guide plate and the sheets opposed to the guide member. The guide members are fit in the right-angled guide grooves.

After assembling the lamp assembly, the light guide plate, and the sheets under the backside of the mold frame, a back cover under the mold frame encloses the above components. At this time, the reflecting sheet and the back cover are spaced apart from each other. The guide members and the back cover are also spaced apart from each other to provide desired design margins.

A problem is presented in that, when the LCD is subjected to an impact test and a vibration test, the reflecting sheet often moves toward the lamp assembly through the gap between the guide members and the back cover. Such displacement degrades the displaying performance of the LCD unit.

SUMMARY OF THE INVENTION

In view of the foregoing, it is an object of the present invention to provide an LCD capable of preventing a reflecting sheet thereof from sliding into a gap existing between guide members of a mold frame thereof and a back cover thereof due to impact and vibration.

This and other objects are satisfied by the present invention, which relates to an LCD that is configured so that its reflective sheet is prevented from sliding into the aforementioned gap between the guide assembly and the back cover. The LCD includes a mold frame which accommodates a prism sheet, a diffusing sheet, a reflecting sheet and a light guide plate and includes at least one guide member which is formed on an end portion thereof and which prevents the sheets and the light guide plate from moving. A lamp assembly is mounted in the mold frame. A liquid crystal display panel is located on the mold frame. A top chassis supports the mold frame and the liquid crystal display as a unit. A back cover is mounted on a rear surface of the mold frame such that a gap is defined between the guide member or guide members and the back cover. A projecting part is formed on at least one guide member and extends rearwardly therefrom toward the back cover. In this configuration, the projecting part prevents the reflecting sheet from being moved through the gap.

According to another aspect of the invention, a plurality of the guide members are formed on end portions of opposed inner surfaces of the mold frame.

According to another aspect of the invention, at least one projecting part is formed on the back cover and projects forwardly toward the guide member. Each projecting part is positioned opposite a respective one of the guide members. As a result, the projecting part or parts prevent the reflecting sheet from being moved through the gap.

BRIEF DESCRIPTION OF THE DRAWINGS

The foregoing objects and other advantages of the present invention will become more apparent with reference to the detailed description of the preferred embodiments below and with reference to the attached drawings, in which.

DETAILED DESCRIPTION OF THE PREFERRED EMBODIMENTS

Figure 1:
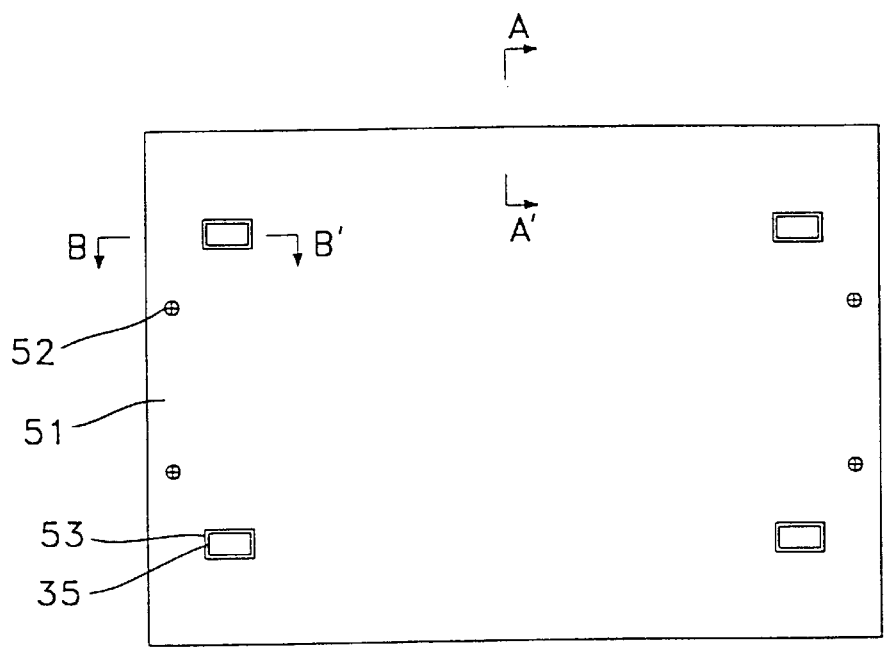
FIG. 1 is a schematic, rear plan view of an LCD according to the present invention showing the back thereof.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

With reference to FIGS. 1–5, an LCD according to the present invention is shown therein having a mold frame 31, a top chassis 41, and a back cover 51 which together serve as a housing of the LCD. A plurality of sheets 20 as well as a lamp assembly 30 are disposed in the mold frame.

As shown in FIG. 1, the back cover 51 covers the entire backside of the LCD and is fixed by means of clamp screws 52. Projecting parts 35 of the mold frame 31 are fit in guide holes 53 formed in the corner areas of the back cover 51.

Figure 2:
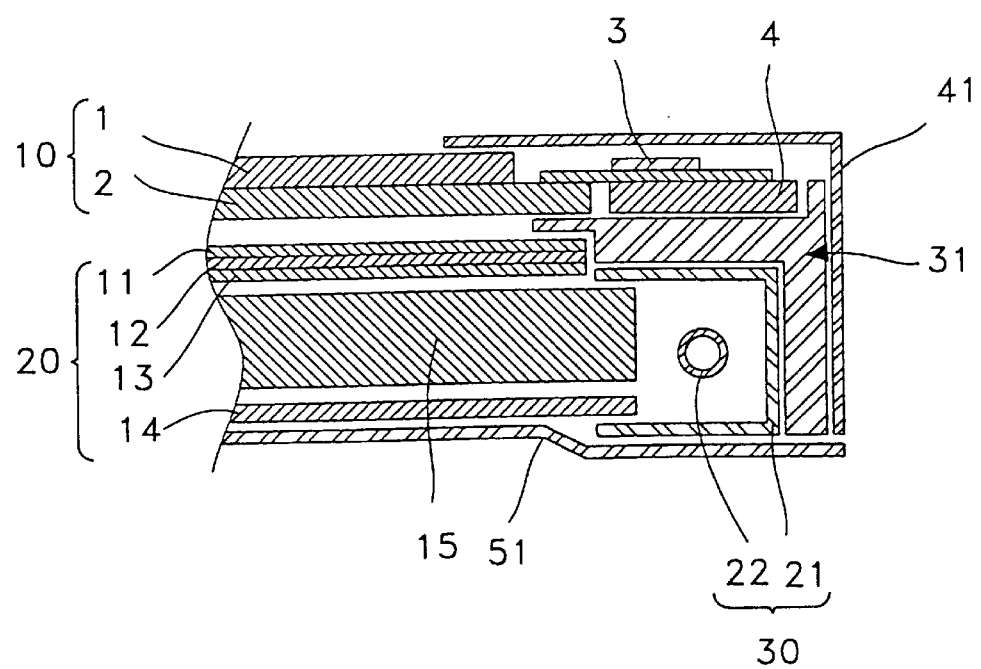
FIG. 2 is a fragmentary, cross-sectional view of a portion taken along line A–A' of FIG. 1.

Referring to FIG. 2, the mold frame 31 serves as a housing of the LCD. An LCD panel 10 for displaying an image is accommodated on the upper surface of the mold frame 31. A light guide plate 15 and sheets 20 are disposed under the lower surface of the mold frame 31. The lamp assembly 30 including a fluorescent lamp 22 and a lamp cover 21 is installed at one or both ends of the light guide plate 15. A top chassis 41 encloses the mold frame 31 and is fixed. The back cover 51 covers the whole backside of the reflecting sheet 14 and is fixed to the mold frame 31.

The LCD panel 10 includes a color filter substrate 1 and a TFT substrate 2 on which TFT elements are formed. The color filter substrate 1 is attached to the upper surface of the TFT substrate 2 and includes a color filter pattern formed on the lower surface thereof. The TFT substrate 2 is electrically connected to a PCB (Printed Circuit Board) 4 through a driving tap IC (Integrated Circuit) 3.

The light guide plate 15 uniformly transmits light from the fluorescent lamp 22 to an image displaying area. The light guide plate 15 is generally formed of a transparent acrylic material having a thickness of several mm, which includes a plurality of dots or V-shaped grooves formed on the lower surface thereof for a uniform reflection. A reflecting sheet 14 (which is one of the sheets 20) is installed under the light guide plate 15 and reflects light of the lamp 22 emitted from the lower surface of the light guide plate 15 back toward the light guide plate 15. The reflecting sheet 14 is generally formed of a polyester (PET) material having a thickness of several hundred $\mu$m. A diffusing sheet 13 is located on the top of the light guide plate 15 and diffuses light applied through the light guide plate 15. A prism sheet 12 concentrates the diffused light and guides the concentrated light straight to the LCD panel. The LCD may include more than one prism sheet 12. A protecting sheet 11 is located on the upper surface of the prism sheet 12 and protects sheets which are sensitive to dust or scratches.

Figure 3:
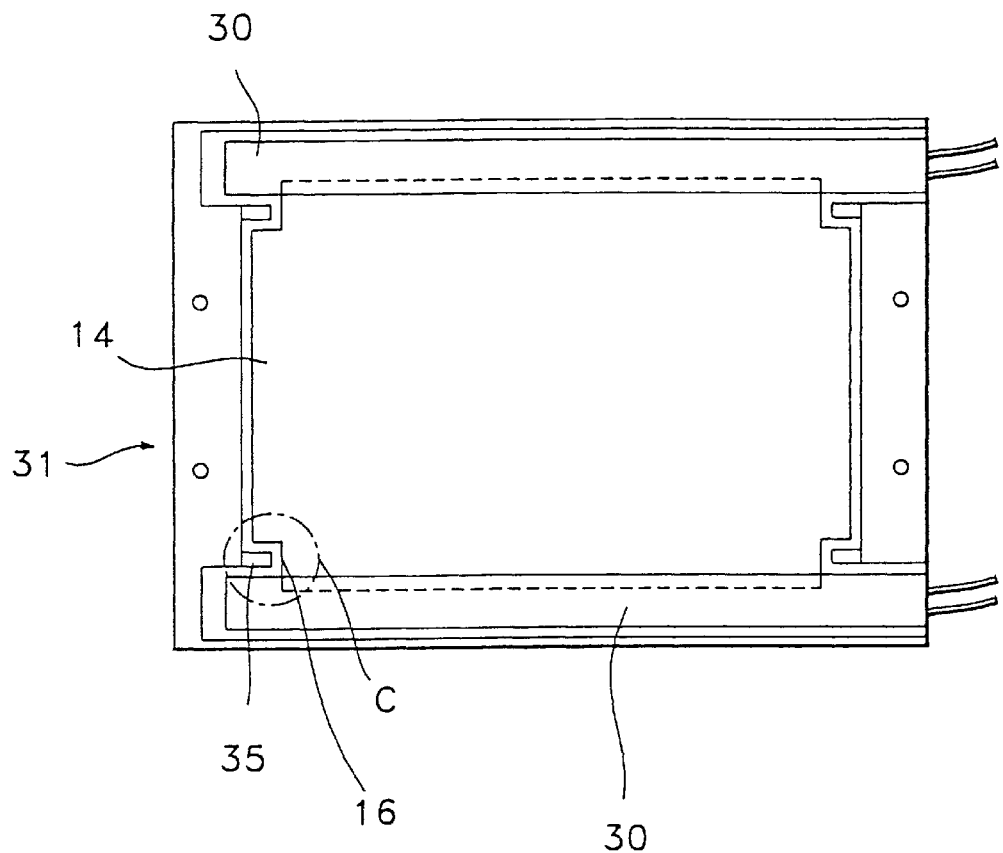
FIG. 3 is a schematic, rear plan view of the LCD of FIG. 1, wherein the back cover is removed.
Figure 4:
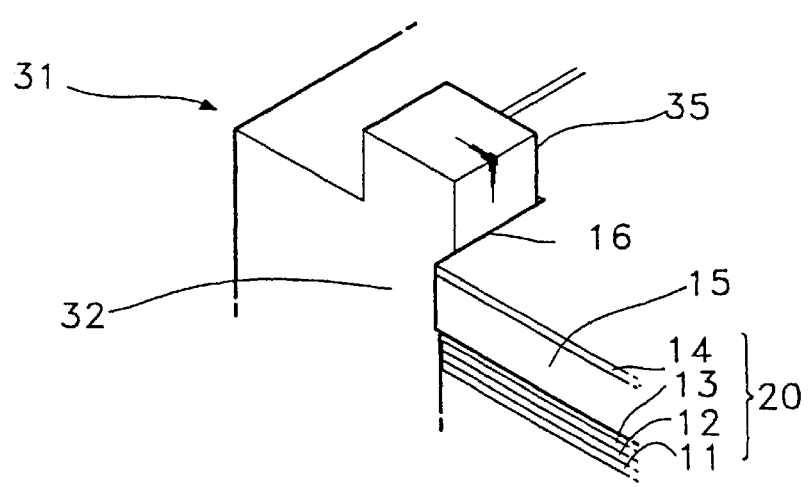
FIG. 4 is a fragmentary, perspective view of a portion C of FIG. 3.

The LCD has right-angled guide grooves 16 formed on the corners of the light guide plate 15 and the sheets 20 as shown in FIGS. 3 and 4. Guide members 32 have shapes corresponding to the right-angled guide grooves 16 and are formed at locations opposed to the right-angled guide grooves 16 by extending the inner side of the mold frame 31. Guide members 32 and guide grooves 16 cooperate to prevent the light guide plate 15 and the sheets 20 from moving toward the lamp assembly 30.

Figure 5:
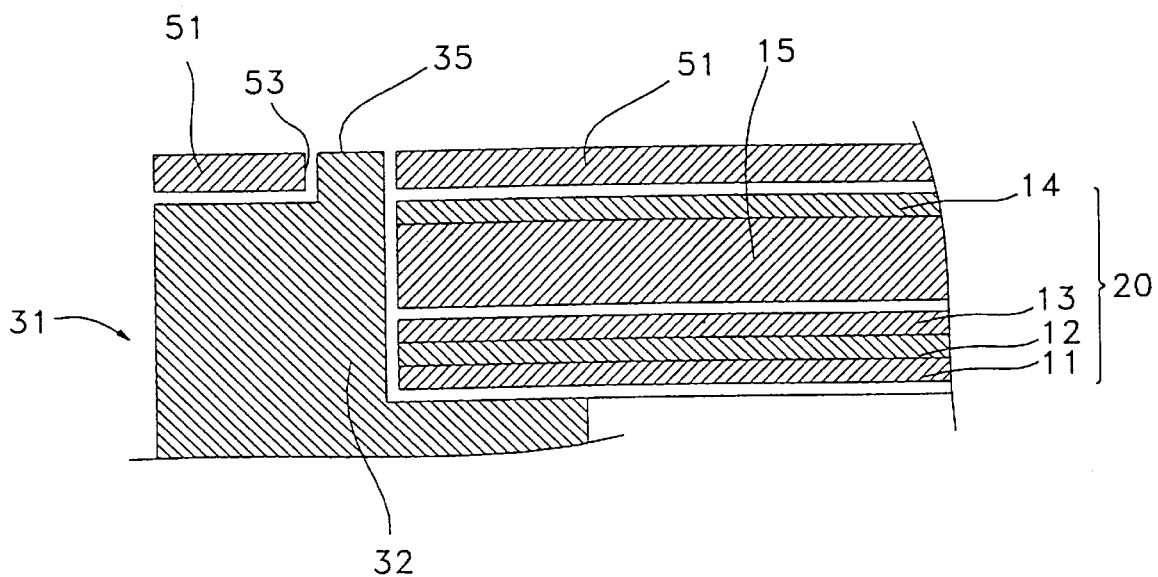
FIG. 5 is a sectional view of a portion of FIG. 1 taken along line B–B'.

In the embodiment as shown in FIGS. 1 and 3, four projecting parts 35 are provided. It will be appreciated that fewer or more projecting parts 35 may be provided. Further, while the projecting parts 35 are shown as rectangular in cross-section, it will be appreciated that other shapes (e.g., diamond, round, hexagonal) or combinations of shapes may be used. In the embodiment as shown, the projecting parts are mirror images of one another. Referring to FIGS. 4 and 5, an exemplary projecting part 35 as shown therein is integrally formed on the rearwardly facing surface of the guide member 32 and extends in the direction of the back cover 51. Preferably, the projecting part 35 has a height extending from the guide member 32 of from about 0.2 to 1 mm.

The projecting parts 35 are inserted into corresponding guide holes 53 formed in the back cover 51 when the back cover 51 is positioned over the lower surface of the mold frame 31. When the back cover 51 is so mounted, the mold frame 31 is joined with the back cover 51 such that the back cover 51 is spaced apart from the reflecting sheet 14. Preferably, in order to minimize the thickness of the LCD, the guide members 32 do not protrude beyond the rear surface of the back cover 51.

As aforementioned, the projecting parts 35 are capable of preventing the reflecting sheet 14 from being moved toward the lamp assembly 30 through the gap (having a width of from about 0.2 to 0.3 mm) existing, for design margin reasons, between the guide members 32 and the back cover 51. That is, the reflecting sheet 14 is blocked by the projecting part 35 when the reflecting sheet 14 is vertically and horizontally moved into the gap. Therefore, by forming the projecting parts having a height of approximately 0.2 to 1 mm, it is possible to prevent degradation of the displaying performance of the LCD, which may be caused by the movement, due to vibration and impact, of the reflecting sheet toward the lamp assembly through the gap existing, for design margin reasons, between the guide members and the back cover. This provides a resultant increase in the reliability of the LCD.

Figure 6A:
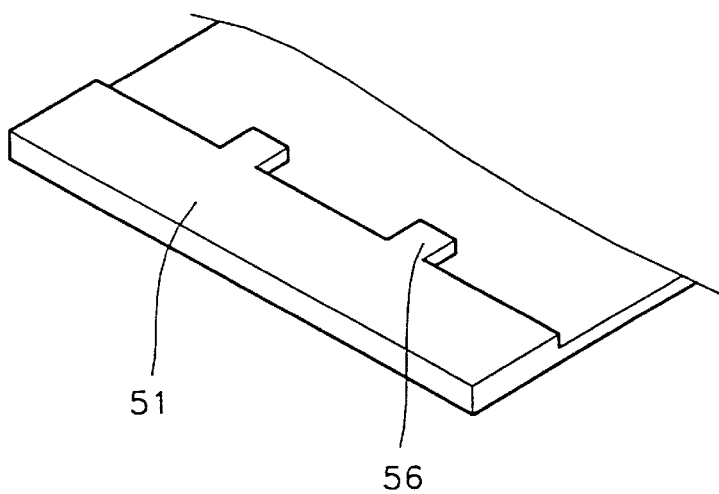
FIG. 6A is a fragmentary, perspective view of a back cover of an LCD according to another embodiment of the present invention.
Figure 6B:
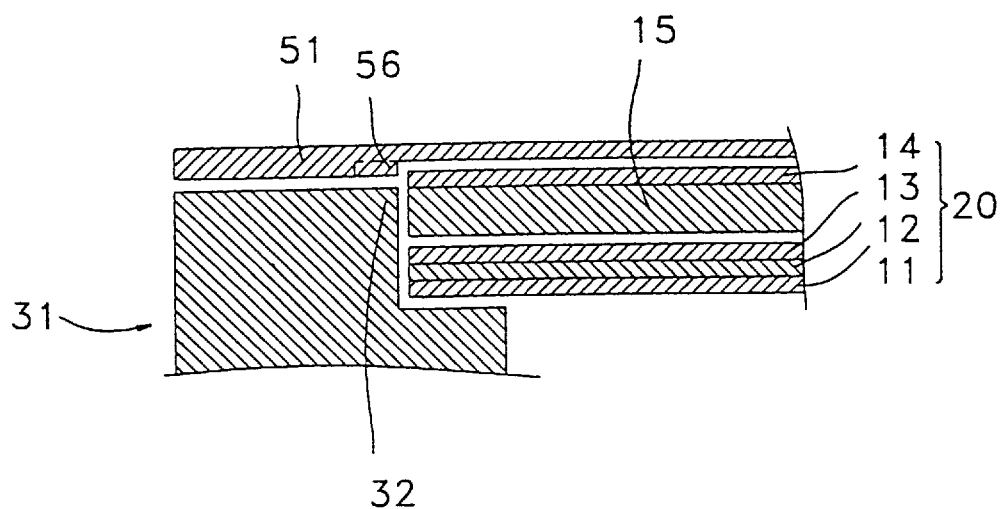
FIG. 6B is a fragmentary, cross-sectional view of the LCD of FIG. 6A.

With reference to FIGS. 6A and 6B, a schematic perspective view and a sectional view of an LCD according to a further embodiment of the invention is shown therein. As shown in FIG. 6A, projecting parts 56 are formed on the back cover 51. The projecting parts 56 preferably have a height of from about 0.2 to 0.4 mm, and are integrally formed with the back cover 51. The projecting parts 56 are positioned at locations corresponding to the guide members 32 integrally formed with the mold frame 31. When the back cover 51 is mounted on the mold frame 31, the guide members 32 contact the projecting parts 56. As a result, the reflecting sheet 14 is prevented from being moved toward the lamp assembly 30 through the gap between the guide members 32 and the back cover 51. That is, the reflecting sheet 14 is blocked by the projecting parts 56 integrally formed with the back cover 51 at locations corresponding to the guide members 32 when the reflecting sheet 14 is vertically and horizontally moved by impact and vibration.

Figure 7A:
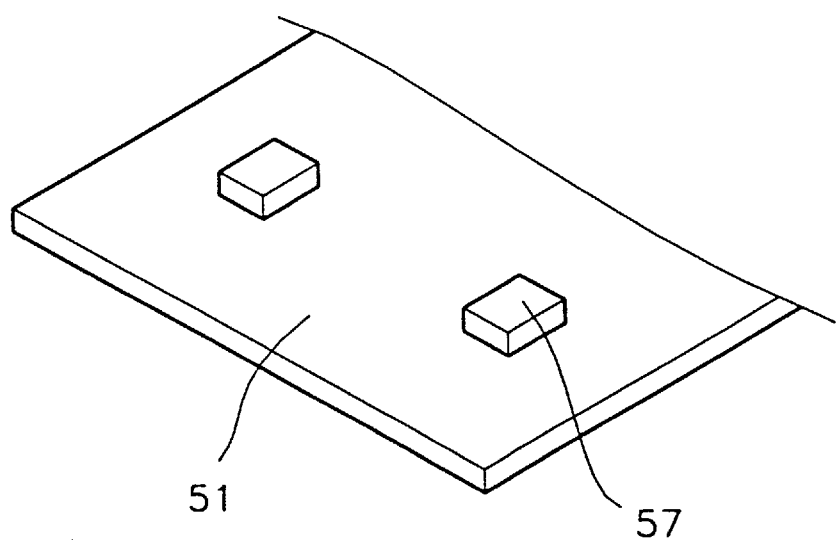
FIG. 7A is a fragmentary, perspective view of a back cover of an LCD according to a further embodiment of the present invention.
Figure 7B:
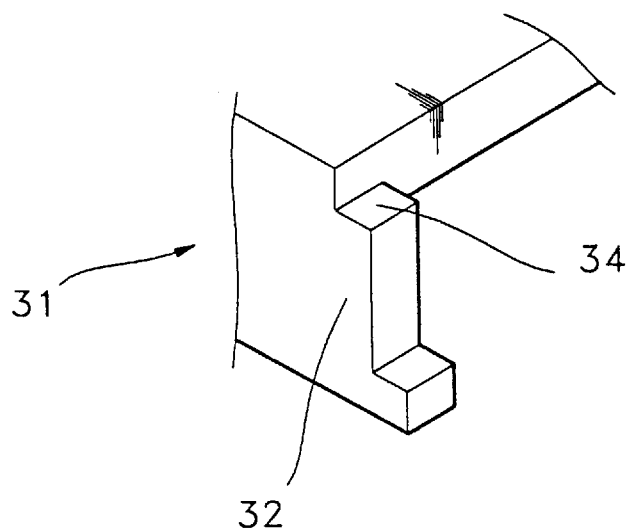
FIG. 7B is a fragmentary, perspective view of a mold frame of the LCD of FIG. 7A.
Figure 7C:
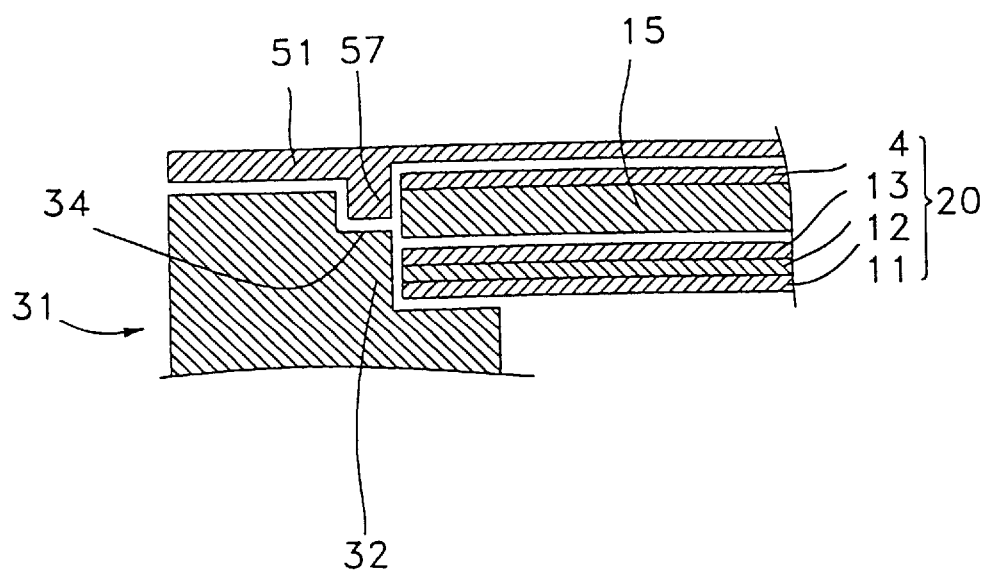
FIG. 7C is a fragmentary, cross-sectional view of the LCD of FIGS. 7A and 7B.

FIGS. 7A and 7B are schematic perspective views and FIG. 7C is a sectional view of an LCD according to still another embodiment of the invention. As shown in FIG. 7B, recessed parts 34 having a predetermined depth and a predetermined shape are formed on the guide members 32 integrally formed with the mold frame 31. As shown in FIG. 7A, projecting parts 57 having a predetermined height (e.g., a height in the range of the thickness of the light guide plate) are formed on the back cover 51 at locations opposed to the guide members 32 so that the surfaces of the recessed parts 34 contact the projecting parts 57 when the back cover 51 is mounted on the mold frame 31. Preferably, the projecting parts 57 have a height of from about 0.2 to 3 mm.

As shown in FIG. 7C, because a surface of the projecting part 57 of the back cover 51 contacts a surface of the recessed part 34 of the guide member 32 when the back cover 51 and the mold frame 31 are assembled, the reflecting sheet 14 is blocked by the projecting parts 57 from being moved by impact and vibration. In this way, the reflecting sheet 14 is prevented from being moved toward the lamp assembly. As a result, degradation of displaying performance of the LCD is likewise prevented.

This invention has been described above with reference to the aforementioned embodiments. It is evident, however, that many alternatives, modifications and variations will be apparent to those skilled in the art in light of the foregoing description. Accordingly, it is intended to embrace all such alternatives, modifications and variations as fall within the spirit and scope of the appended claims.

That which is claimed is:

1. A liquid crystal display having improved resistance to degradation from impact and vibration, said liquid crystal display comprising:

a mold frame including at least one guide member, said at least one guide member being formed on an end portion of said mold frame;

a prism sheet;

a diffusing sheet;

a reflecting sheet;

a light guide plate;

said prism sheet, said diffusing sheet, said reflecting sheet, and said light guide plate being positioned within said mold frame, said at least one guide member preventing said sheets and said light guide plate from moving;

a lamp assembly mounted in said mold frame;

a liquid crystal display panel located on said mold frame;

a top chassis which supports said mold frame and said liquid crystal display as a unit;

a back cover mounted on a rear surface of said mold frame and defining a gap between said at least one guide member and said back cover; and at least one projecting part formed on said at least one guide member and extending rearwardly therefrom toward said back cover, whereby said projecting part prevents said reflecting sheet from being moved through said gap.

2. The liquid crystal display of claim 1 including a plurality of said guide members formed on end portions of opposed inner surfaces of said mold frame, and further including a plurality of said projecting parts, each said projecting part formed on a respective one of said plurality of guide members and extending rearwardly therefrom and toward said back cover.

3. The liquid crystal display of claim 2, wherein said projecting parts are formed on each of at least a pair of diagonally opposed guide members of said plurality of guide members.

4. The liquid crystal display of claim 1, wherein said back cover opposed to said at least one projecting part includes at least one guide hole for receiving said at least one projecting part such that said projecting part does not protrude rearwardly beyond said back cover.

5. The liquid crystal display of claim 4, wherein said at least one projecting part has a height extending beyond said at least one guide member of between about 0.2 to 1 mm.

6. The liquid crystal display of claim 1, wherein said at least one projecting part is in contact with said back cover.

7. A liquid crystal display having improved resistance to degradation from impact and vibration, said liquid crystal display comprising:

a mold frame including at least one guide member, said guide member being formed on an end portion of said mold frame;

a prism sheet;

a diffusing sheet;

a reflecting sheet;

a light guide plate;

said prism sheet, said diffusing sheet, said reflecting sheet, and said light guide plate being positioned within said mold frame, said at least one guide member preventing said sheets and said light guide plate from moving;

a lamp assembly mounted in said mold frame;

a liquid crystal display panel located on said mold frame;

a top chassis which supports said mold frame and said liquid crystal display as a unit;

a back cover mounted on a rear surface of said mold frame and defining a gap between said at least one guide member and said back cover; and at least one projecting part formed on said back cover and projecting forwardly toward said at least one guide member, said projecting part positioned opposite said at least one guide member, whereby said projecting part prevents said reflecting sheet from being moved through said gap.

8. The liquid crystal display of claim 7 including a plurality of said guide members formed on end portions of opposed inner surfaces of said mold frame, and further including a plurality of said projecting parts, each said projecting part positioned opposite a respective one of said guide members.

9. The liquid crystal display of claim 8, wherein said projecting parts are formed on said back cover at locations opposed to at least a pair of diagonally opposed guide members of said plurality of guide members.

10. The liquid crystal display of claim 7, wherein said at least one projecting part is received in a recessed part formed in said at least one guide member.

11. The liquid crystal display of claim 10, wherein said projecting part has a height of from about 0.2 to 3 mm.

12. The liquid crystal display of claim 7, wherein a surface of said at least one projecting part is in contact with a surface of said at least one guide member.

* * * * *